(12) United States Patent  (10) Patent No.: US 8,370,224 B2
Grewal  (45) Date of Patent: Feb. 5, 2013

(54) GRAPHICAL INTERFACE FOR DISPLAY OF ASSETS IN AN ASSET MANAGEMENT SYSTEM

(75) Inventor: Ardaman Singh Grewal, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 247 days.

(21) Appl. No.: 11/535,549

(22) Filed: Sep. 27, 2006

(65) Prior Publication Data

US 2008/0077512 A1  Mar. 27, 2008

(51) Int. Cl.
*A01K 5/02* (2006.01)
*G06F 17/50* (2006.01)

(52) U.S. Cl. ......................................................... 705/29
(58) Field of Classification Search ..................... 705/29; 715/853
See application file for complete search history.

(56) References Cited

U.S. PATENT DOCUMENTS

| | | | |
|---|---|---|---|
| 4,672,039 A | 6/1987 | Lundblom |
| 5,414,812 A | 5/1995 | Filip et al. |
| 5,455,775 A | 10/1995 | Huber et al. |
| 5,638,071 A | 6/1997 | Capofreddi et al. |
| 5,917,433 A | 6/1999 | Keillor et al. |
| 6,005,571 A | 12/1999 | Pachauri |
| 6,256,768 B1 | 7/2001 | Igusa |
| 6,366,916 B1 | 4/2002 | Baer et al. |
| 6,421,571 B1 | 7/2002 | Spriggs et al. |
| 6,430,536 B2 | 8/2002 | Irving et al. |
| 6,574,779 B2 | 6/2003 | Allen et al. |
| 6,581,045 B1 | 6/2003 | Watson |
| 6,631,552 B2 | 10/2003 | Yamaguchi |
| 6,650,346 B1 | 11/2003 | Jaeger et al. |
| 6,691,115 B2 | 2/2004 | Mosher, Jr. et al. |
| 6,735,752 B2 | 5/2004 | Manoo |
| 6,738,958 B2 | 5/2004 | Manoo |
| 6,763,377 B1 | 7/2004 | Belknap et al. |
| 6,775,576 B2 | 8/2004 | Spriggs et al. |
| 6,782,399 B2 | 8/2004 | Mosher, Jr. |
| 6,789,214 B1 | 9/2004 | De Bonis-Hamelin et al. |
| 6,806,813 B1 | 10/2004 | Cheng et al. |
| 6,847,982 B2 | 1/2005 | Parker et al. |
| 6,889,096 B2 * | 5/2005 | Spriggs et al. ................. 700/17 |

(Continued)

FOREIGN PATENT DOCUMENTS

GB  2414568 A  11/2005
WO  2006/081024 A2  8/2006

OTHER PUBLICATIONS

"Gibson Petroleum Selects Cquay to Add Location Intelligence to Fleet Management System." Canada NewsWire Nov. 29, 2001 ProQuest Newsstand, ProQuest. Web. Aug. 9, 2012.*

(Continued)

*Primary Examiner* — Seye Iwarere
(74) *Attorney, Agent, or Firm* — Turocy & Watson, LLP; Alexander R. Kuszewski; John M. Miller

(57) ABSTRACT

The claimed subject matter provides a system and/or method that facilitates employing a graphical user interface to monitor and/or manage an asset within an industrial environment. A graphical user interface can facilitate asset management including a first field that provides a user with a hierarchical representation of assets within an industrial environment. The graphical user interface can further include a second field that displays available management functionality associated with an asset selected within the first field.

27 Claims, 11 Drawing Sheets

U.S. PATENT DOCUMENTS

| | | | |
|---|---|---|---|
| 6,961,687 B1* | 11/2005 | Myers et al. | 703/6 |
| 6,989,751 B2 | 1/2006 | Richards | |
| D522,523 S | 6/2006 | Parta | |
| 7,058,154 B1 | 6/2006 | Stark et al. | |
| 7,062,455 B1 | 6/2006 | Tobey | |
| 7,069,558 B1 | 6/2006 | Stone et al. | |
| 7,102,493 B1 | 9/2006 | Coppinger et al. | |
| 7,110,110 B2 | 9/2006 | Fink | |
| 7,116,228 B1 | 10/2006 | Singleton | |
| 7,117,443 B1 | 10/2006 | Zilka et al. | |
| 7,313,592 B1* | 12/2007 | Huboi et al. | 709/203 |
| 7,584,165 B2* | 9/2009 | Buchan | 706/60 |
| 2001/0027378 A1* | 10/2001 | Tennison et al. | 701/213 |
| 2001/0052013 A1* | 12/2001 | Munguia et al. | 709/225 |
| 2002/0065698 A1* | 5/2002 | Schick et al. | 705/8 |
| 2002/0116308 A1 | 8/2002 | Cunningham | |
| 2003/0028269 A1* | 2/2003 | Spriggs et al. | 700/83 |
| 2003/0028544 A1 | 2/2003 | Virag et al. | |
| 2003/0055666 A1* | 3/2003 | Roddy et al. | 705/1 |
| 2003/0061159 A1* | 3/2003 | Adams et al. | 705/40 |
| 2003/0078960 A1* | 4/2003 | Murren et al. | 709/203 |
| 2003/0084067 A1* | 5/2003 | Obiaya | 707/104.1 |
| 2003/0144930 A1 | 7/2003 | Kulkarni et al. | |
| 2003/0154199 A1 | 8/2003 | Thomas et al. | |
| 2003/0195764 A1 | 10/2003 | Baker et al. | |
| 2003/0225650 A1 | 12/2003 | Wilson et al. | |
| 2003/0233438 A1 | 12/2003 | Hutchinson et al. | |
| 2004/0015367 A1 | 1/2004 | Nicastro et al. | |
| 2004/0024660 A1 | 2/2004 | Ganesh et al. | |
| 2004/0111335 A1 | 6/2004 | Black et al. | |
| 2004/0153437 A1* | 8/2004 | Buchan | 707/1 |
| 2004/0186927 A1 | 9/2004 | Eryurek et al. | |
| 2004/0215544 A1 | 10/2004 | Formal et al. | |
| 2005/0043977 A1* | 2/2005 | Ahern et al. | 705/7 |
| 2005/0120288 A1 | 6/2005 | Boehme et al. | |
| 2005/0242181 A1 | 11/2005 | Cunningham et al. | |
| 2005/0258956 A1 | 11/2005 | Neuwirth | |
| 2005/0283718 A1 | 12/2005 | Wilson et al. | |
| 2006/0085242 A1 | 4/2006 | Mark | |
| 2006/0161593 A1 | 7/2006 | Mori et al. | |
| 2006/0184540 A1* | 8/2006 | Kung et al. | 707/10 |
| 2007/0214179 A1* | 9/2007 | Hoang | 707/104.1 |
| 2008/0015955 A1* | 1/2008 | Ehrman et al. | 705/28 |

OTHER PUBLICATIONS

European Search Report for EP Application Serial No. 07117179.7, dated Sep. 27, 2010, 7 pages.

* cited by examiner

GRAPHICAL INTERFACE FOR DISPLAY OF ASSETS IN AN ASSET MANAGEMENT SYSTEM

TECHNICAL FIELD

The claimed subject matter relates generally to asset management in a facility and, more particularly, to representing assets within an industrial facility.

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases or web services referencing databases that are accessible by system/process/project managers on a factory floor. For instance, sensors and associated software can detect a number of instances that a particular machine has completed an operation given a defined amount of time. Additionally, data from sensors can be delivered to a processing unit related to system alarms. Thus, a factory automation system can review collected data and automatically and/or semi-automatically schedule maintenance of a device, replacement of a device, and other various procedures that relate to automating a process.

Control of a process is typically effectuated through controlling one or more assets within a facility, wherein assets can include hardware, such as programmable logic controllers, machines, switches, and the like as well as software components, such as certain programs, sub-programs, and the like. The assets themselves are typically associated with an asset management program and/or functionality, which is conventionally associated with tasks such as backing up devices, checking auditing capabilities, archiving data, periodic scanning of assets to ensure that they are operating without problems, monitoring data entering and leaving a plant floor, and the like.

To initiate and/or monitor functionality associated with asset management, one conventionally selects a desired functionality and thereafter assets are displayed that are associated with such functionality. Pursuant to one particular example, to back up a PLC, a user begins such backup by initiating an application function. Thereafter, a schedule is created and functionality associated with backing up the PLC is placed within the schedule. Finally, the schedule is run and the PLC is backed up. There is no convenient mechanism for initially determining what functionality is associated with an asset much less conveniently managing and/or monitoring particular assets.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The subject innovation relates to systems and/or methods that facilitate employing a graphical user interface to monitor and/or manage an asset within an industrial environment. A graphical user interface can be employed to traverse through a hierarchy of assets to select a desired asset, wherein such selection can allow the management and/or observation of assets, asset details, available functionality, hierarchy location, etc. For instance, management can relate to validating an asset, backing up an asset, archiving data associated with an asset, updating an asset with new or additional software or firmware, and the like. Further, an asset can be a physical device, such as a programmable logic controller, a pump, a press, a valve, a drain, a heater, a cooler, a switch, a sensor, a conveyor, and/or a portion thereof, as well as software, firmware, etc. The graphical user interface can include a first field that includes an expandable and/or collapsible hierarchy of assets, wherein buttons or the like can be selected by a pointing mechanism to expand or contract at least a portion of the hierarchy. Upon selection of an asset, a separate display field can be populated with a listing of management functionalities available with respect to the selected asset.

In another aspect in accordance with the subject innovation, the graphical user interface can include an asset graphic that relates to the selected asset, a geographic map of the hierarchy, a geographic map of the industrial environment, a graphical representation of the asset, a portion of the graphical depiction that can be drilled down for a more granular view, etc. Moreover, the graphical user interface can include a graphical button to allow the selection of various options associated with managing and/or monitoring assets within the industrial environment. The graphical user interface can include an update graphical button that can provide an update related to a change to at least one of the asset, an asset functionality, the hierarchical representation of assets, an asset graphic, and data associated with the industrial environment. In addition, the graphical user interface can include a detail graphical button that can provide details related to at least one of the asset, an asset functionality, the hierarchical representation of assets, an asset graphic, and data associated with the industrial environment.

In accordance with an aspect of the claimed subject matter, a graphical user interface component can provide interactions with a hierarchical representation of assets, wherein the assets are within an industrial environment. The graphical user interface component can receive a user input that can relate to selecting an asset, a graphical button, an asset graphic, an available functionality, and the like. The subject innovation can further include a data repository that can retain the hierarchical representation of assets, wherein the hierarchical arrangement can be provided to a user by way of the graphical user interface component. The data repository can be a single data repository and/or can be a distributed data store. The hierarchy can be based at least in part upon the physical location of devices (e.g., a region of a factory can have several defined sub-regions, which in turn can comprise sub-regions), standards associated with industry, such as ISA, S95, ISA S88, and the like, proprietary hierarchy that is provided by an enterprise, or any other suitable hierarchy.

In accordance with another aspect of the innovation described herein, the graphical user interface component can utilize a detection component that can detect any alterations associated with assets within the industrial environment. In particular, the detection component can be communicatively coupled to the industrial environment and poll the assets to ascertain if any assets have been added, removed, changed, and/or any combination thereof. Moreover, the subject innovation can further include an updating component that can update the hierarchical representation of assets in accordance with any alterations detected by the detection component. By providing detection and updating of any alterations associated with the assets within the industrial environment, the graphical user interface component can provide accurate and up-to-date information to a user and/or entity. In other aspects of the claimed subject matter, methods are provided that facilitates employing a graphical user interface to monitor and/or manage an asset within an industrial environment.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed and such subject matter is intended to include all such aspects and their equivalents. Other advantages and novel features will become apparent from the following detailed description of the invention when considered in conjunction with the drawings.

DETAILED DESCRIPTION

Figure 1:
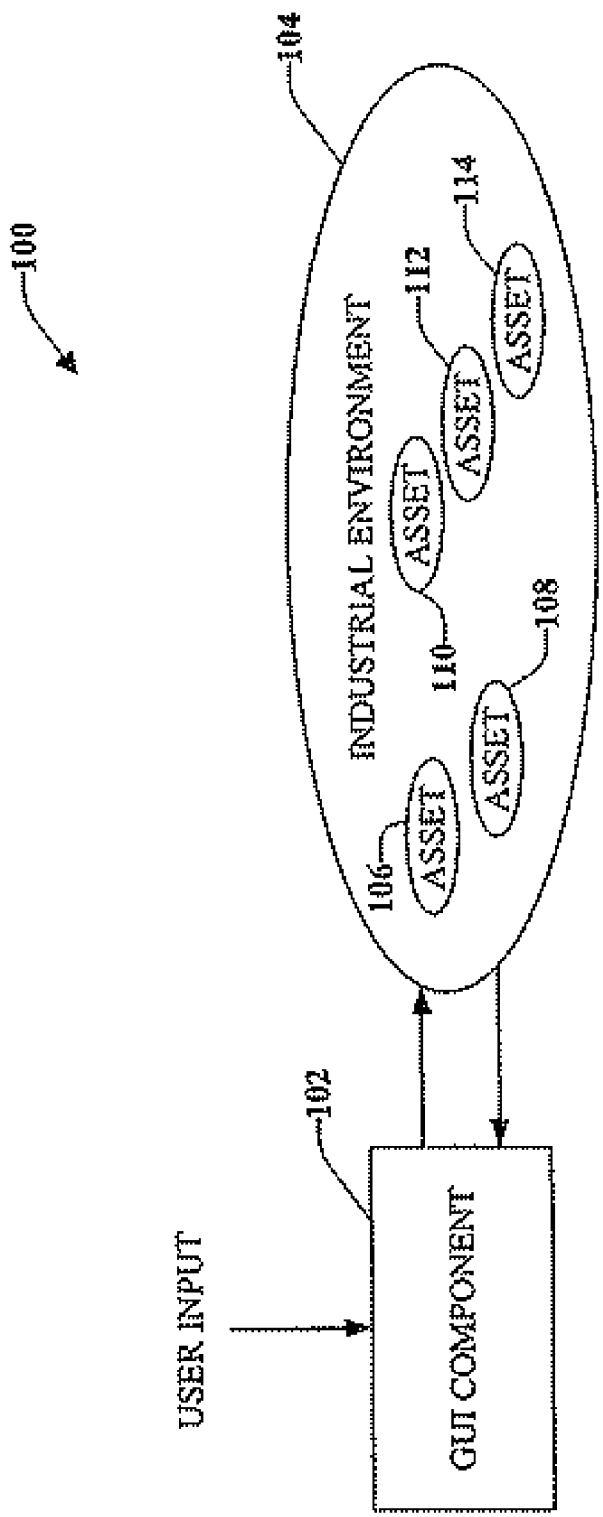
FIG. 1 illustrates a block diagram of an exemplary system that facilitates employing a graphical user interface to monitor and/or manage an asset within an industrial environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component may be, but is not limited to a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, aspects of the claimed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

Now referring to the drawings, FIG. 1 illustrates a system 100 that facilitates managing and/or monitoring one or more assets within an industrial environment. In particular, the system 100 facilitates employing a graphical user interface (also referred to as a GUI) to monitor and/or manage an asset within an industrial environment. For instance, management can relate to validating an asset, backing up an asset, archiving data associated with an asset, updating an asset with new or additional software or firmware, and the like. Further, an asset can be a physical device, such as a programmable logic controller, a pump, a press, a valve, a drain, a heater, a cooler, a switch, a sensor, a conveyor, and/or a portion thereof, as well as software, firmware, etc. Conventionally, to perform management upon one or more assets within an industrial environment, a desired functionality is selected through an asset management application, a desired asset is located, such asset is checked out and placed within a schedule, the schedule is run, and then the asset is checked back in. Such process is counterintuitive and results in inefficiencies and mistakes in connection with managing multiple assets. Furthermore, conventional systems and/or techniques lacked monitoring of such assets and/or respective functionalities in an efficient manner.

The system 100 overcomes such deficiencies by utilizing a graphical user interface component 102 (also referred to as GUI component 102) that can incorporate an asset-centric approach rather than a functionality-centric approach to asset management and/or monitoring. The graphical user interface component 102 can provide at least one field to allow interaction, observation, and/or manipulation associated with assets, asset functionalities, asset navigation, etc. The graphical user interface component 102 can provide management and/or monitoring of at least one asset associated with an industrial environment 102. The industrial environment 104 can include various assets 106-114 wherein at least two assets can be hierarchically arranged, such as one that is utilized to manufacture consumables, textiles, automobiles, or any other suitable industrial environment. To illustrate another example hierarchy, the asset 110 may be a programmable logic controller, while the assets 112 and 114 may be different control programs effectuated by the asset 110. Thus, the hierarchical representation of assets may be a combination of physical devices and software.

In particular, the graphical user interface component 102 can receive a user input, wherein the input can relate to selecting a particular asset associated with a hierarchical structure within an industrial environment 104 to allow viewing of respective characteristics (e.g., available functionality, asset description, navigational data, etc.) and/or management of the selected asset. The hierarchical representation of assets can include a representation of an asset 118 that is requested by a user (e.g., receiving a user input). For instance, the user may wish to perform particular management functionality with respect to the asset via the graphical user interface component 102. The user can select the representation of the asset utilizing the graphical user interface component 102, which can be or include a pointing and clicking mechanism, a pressure-sensitive screen, voice commands, software associated with selecting the representation of the asset, or any other suitable manner for selecting an asset. Once the representation of the asset has been selected, various data related thereto can be displayed to the user such as, but not limited to, asset management functionality that is available with respect to the selected asset, asset description, asset navigational data, hierarchical data associated to the asset, asset details, functionality data, and/or any other suitable data related to the asset and/or the respective functionality.

Thus, for instance, if the representation of the asset represents a PLC, and the user selects such representation, functionality such as "back up PLC", "archive data within the PLC", "update PLC with particular firmware", and the like can be provided to the user via the graphical user interface component 102. For instance, the PLC can be backed up if the user selects the "backup PLC" functionality utilizing the graphical user interface component 102. Accordingly, the system 100 is more intuitive when compared to conventional systems, as effectuation of monitoring and/or management functionality is asset-centric. Additionally, locating an asset and functionality associated therewith is made easier through the hierarchical representation of assets and the graphical user interface component 102.

Figure 2:
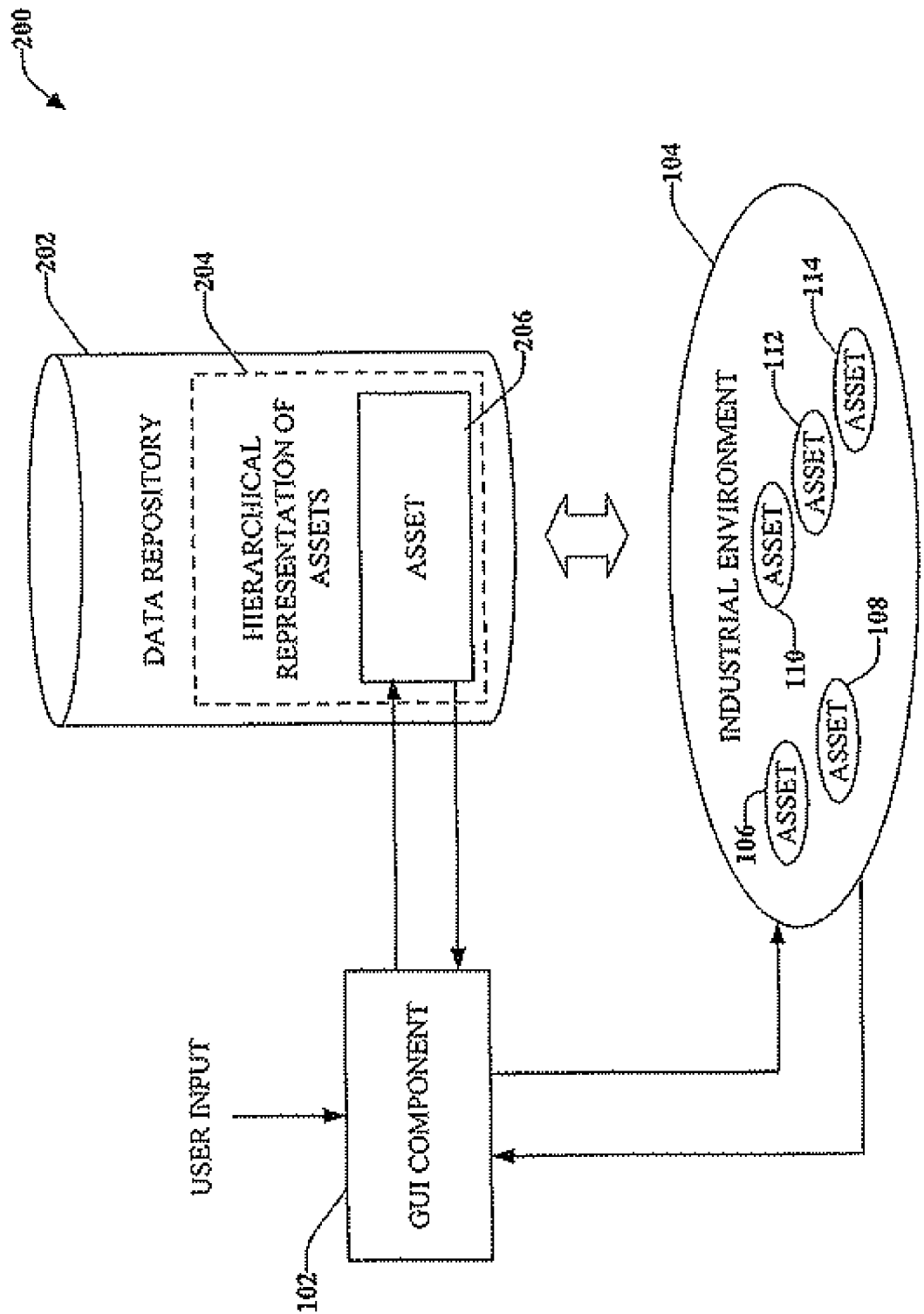
FIG. 2 illustrates a block diagram of an exemplary system that facilitates implementing a graphical user interface allowing a user to traverse through a hierarchy of assets related to an industrial environment.

FIG. 2 illustrates a system 200 that facilitates implementing a graphical user interface allowing a user to traverse through a hierarchy of assets related to an industrial environment. The system 200 can include the graphical user interface 102 that can monitor and/or manage at least one asset associated with the industrial environment 104. The system 200 can further include a data repository 202 that can retain a hierarchical representation of assets 204, wherein the hierarchical arrangement can be provided to a user by way of the graphical user interface component 102. The data repository 202 can be a single data repository and/or can be a distributed data store. The hierarchy can be based at least in part upon the physical location of devices (e.g., a region of a factory can have several defined sub-regions, which in turn can comprise sub-regions), standards associated with industry, such as ISA, S95, ISA S88, and the like, proprietary hierarchy that is provided by an enterprise, or any other suitable hierarchy. For instance, a top portion of the hierarchy may be a plant, and a sub-level of the plant may be programmable logic controllers utilized within the plant, and a sub-level of the programmable logic controllers can be devices controlled by such controllers. It is understood that this is but one example of a hierarchy, and is for illustrative purposes only.

The hierarchical representation of assets 204 can include a representation of an asset 206 that is requested and/or selected by a user and/or other entity (e.g., signal, database, software, application, computer, etc.). For example, a user can request the representation of the asset 206 through the graphical user interface component 102 (e.g., pointing and clicking techniques utilizing input devices, touch-screen, voice commands, software associated with selecting the representation of the asset 206, and the like). Once requested and/or selected, various options can be provided to the user via the graphical user interface component 102 such as, for instance, asset descriptions, asset navigational guide/map, asset details, functionality management details, respective functionality availability, monitoring, tracking, etc. It is to be appreciated that the graphical user interface component 102 can provide any suitable manipulation, monitoring, tracking, and/or management option associated with the selected representation of the asset 206 and the subject innovation is not limited by the examples stated above.

The graphical user interface component 102 can additionally allow selected options to permeate through lower levels of the hierarchy. For example, the hierarchy can be based upon location, and various devices and software can reside in the hierarchy beneath the location. If the user selects a certain area and thereafter selects a "validate" functionality, the functionality can be permeated through each of the devices within that area (e.g., underneath the particular node in the hierarchical tree). Thus, a plant can include an area A and an area B, wherein each can be broken into a plurality of sectors and/or sections. If area A is to be validated, the entire area A and all sub-sections can be validated utilizing the graphical user interface component 102 without having to individually select each particular asset associated therewith. One skilled in the art will appreciate that various asset management functionalities can be permeated throughout any suitable portions of a hierarchy.

Figure 3:
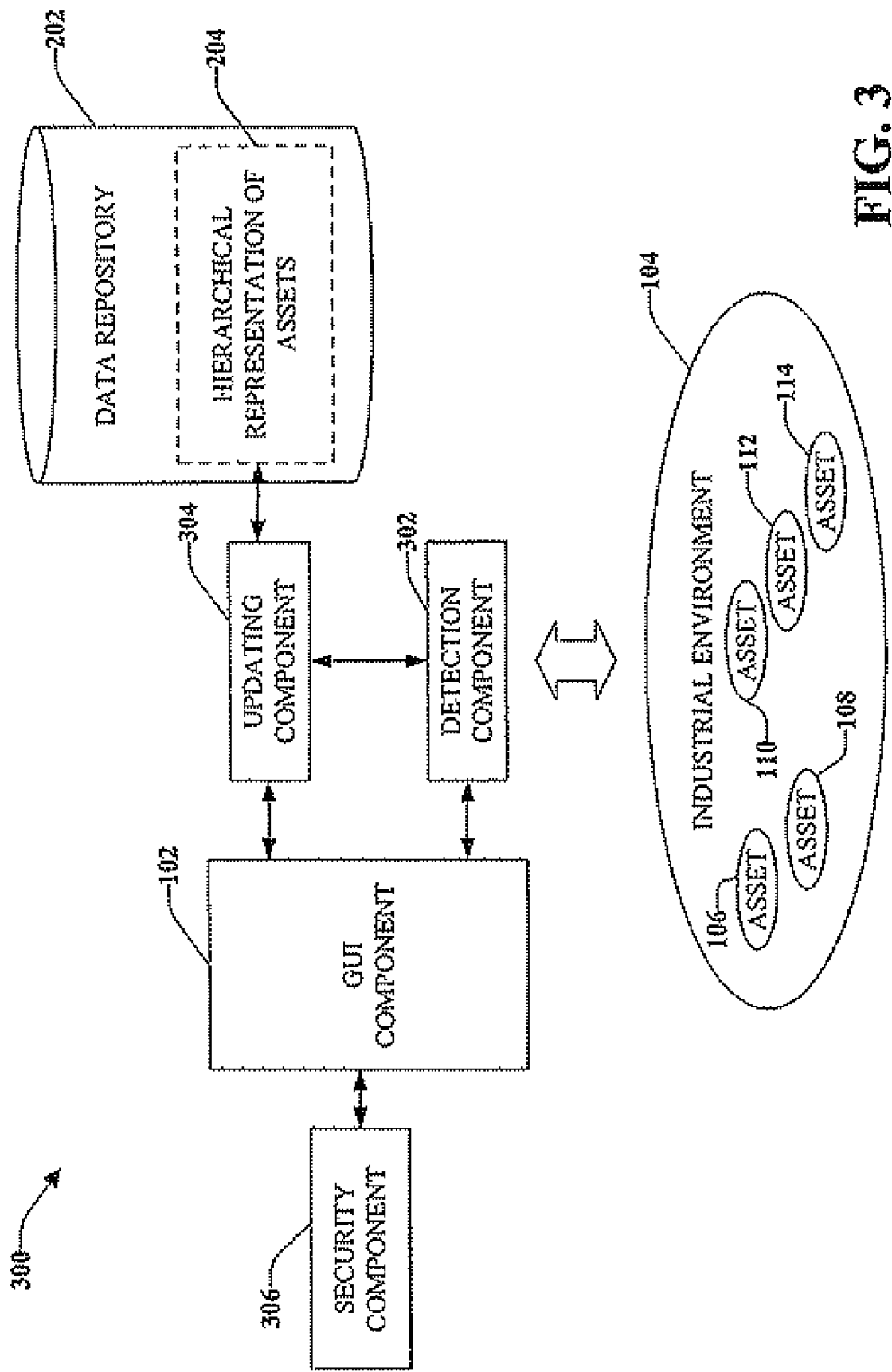
FIG. 3 illustrates a block diagram of an exemplary system that facilitates functionality management and/or monitoring associated with an asset within an industrial environment.

FIG. 3 illustrates a system 300 that facilitates functionality management and/or monitoring associated with an asset within an industrial environment. The system 300 can include a detection component 302 that can be communicatively coupled to the industrial environment 104 and, in turn, the assets 106-114. For example, the assets 106-114 can be communicatively coupled by way of an intranet or other suitable network. The detection component 302 can ascertain when an asset has been added to the industrial environment 104, removed from the industrial environment 104, updated within the industrial environment 104, and/or any combination thereof. Any changes associated with the assets 106-114 can be communicated to the graphical user interface component 102 to allow a user and/or any suitable entity to view, monitor, and/or obtain any manipulations associated with the industrial environment 104 and respective assets 106-114. Pursuant to an example, the detection component 302 can poll a network to determine whether any alterations have been made with respect to assets resident upon the network. In another example, an asset may have sufficient intelligence to initiate a message to the detection component 302, wherein such message can include a type or identity of the asset, location upon a network of the asset, associated assets, etc. Still further, an asset can indicate to the detection component 302 a type of update associated with the asset.

Once an alteration occurs with respect to one or more assets within the industrial environment 104 and such alteration has been detected by the detection component 302, an updating component 304 can update the hierarchical representation of assets 204 within the data repository 202. For instance, if an asset is added to the industrial environment 104, the updating component 304 can ascertain a type of such asset, location of the asset, and the like based upon detections made by the detection component 302. The updating component 304 can then review the structure of the hierarchical representation of assets 204 (e.g., to determine whether it is based on location, functionality of devices, . . . ). Once this review has been undertaken, the updating component 304 can intelligently and automatically update the hierarchical representation of assets 204. For instance, if an asset is added to the industrial environment 104, the updating component 304 can add the asset in an appropriate position within the hierarchical representation of assets 204.

The graphical user interface component 102 can utilize various graphics and/or alerts to indicate updates and/or changes associated with the assets 106-114 within the industrial environment 104. In particular, upon the detection of an alteration of at least one asset within the industrial environment 104, the graphical user interface component 102 can indicate such detection with, for example, an alert, an audible alert, a graphical icon, a graphic, a textual document, an email, a text, etc. Moreover, any updates associated with the hierarchical representation of assets 204 can be indicated via the graphical user interface component 102 utilizing, for instance, an alert, an audible alert, a graphical icon, a graphic, a textual document, an email, a text, etc.

The updating component 304 can also be employed to associate updated functionality with assets represented within the hierarchical representation of assets 204. Pursuant to an example, particular verification functionality may become available with respect to certain PLCs. The updating component can update the functionality with respect to such PLCs that are represented within the hierarchical representation of assets 104 and can allow the subsequent and/or real-time update to a user and/or entity via the graphical user interface component 102. Therefore, if a representation of such asset is selected by a user, the new or enhanced functionality will also be displayed. According to an example, the updating component 304 can be connected to a network (e.g., the Internet) and can receive functionality updates through web services or the like.

The data repository 202 can additionally include electronic documents (not shown) that are associated with assets that are employed and/or are possibly employed within the industrial environment 104. The electronic documents 302 may be descriptive of operation of assets, such as operation instructions. The electronic documents can also be warranties or any other suitable documents relating to assets within the industrial environment 104. While shown as residing within the same data repository 202, it is understood and appreciated that the electronic documents and the hierarchical representation of assets 204 can reside upon different storage mediums and/or can be distributed across several storage mediums. It is to be appreciated that the graphical user interface component 102 can further facilitate displaying, monitoring, and/or managing any electric documents associated with the assets 106-114 within the industrial automation environment 104. For instance, a user can utilize a mouse to select a representation of the aforementioned asset within a graphical user interface component 102 of the hierarchical representation of assets 204. Once selected, options relating to reviewing or updating one or more electronic documents can be provided to the user. Furthermore, the user can be made aware of types of electronic documents available with respect to a desired asset (e.g., warranty documents, schematics, user manuals, . . . ). The user can select a desired electronic document through use of the graphical user interface component 102.

The system 300 can additionally include a security component 306 that can ascertain which assets and/or functionalities associated therewith the user is authorized to request/implement via the graphical user interface component 102. In accordance with one example, a user may only be authorized to implement certain management functionalities with respect to a certain asset, while not authorized to implement other particular management functionalities associated with such asset. The security component 306 can determine identity of a user by analyzing, for instance, usernames, passwords, personal identification numbers, personal status, management positions, occupation hierarchy, and the like. Furthermore, the security component 306 can determine a user's identity by analyzing biometric indicia, such as voice recognition, fingerprint analysis, retina analysis, etc.

Still further, the security component 306 can perform granular security with respect to a user and/or an asset. Pursuant to one example, a user's rights with respect to a particular asset can change as time alters. For instance, certain management functionality associated with an asset requested by a user can be accessible by the user during a first shift but not accessible to the user during a second shift. Additionally, the security component 306 can provide different measures of security given different states of an asset. Therefore, for example, a user may have rights with respect to functionality when an asset is in a first state but may have different rights with respect to the same functionality when the asset is in a second state. Once a user has been identified and rights associated with such user have been determined, the user can select functionality associated with an asset within the industrial environment 104. The graphical user interface component 102 can thereafter be employed to implement such functionality with respect to an appropriate asset (or assets).

In addition, the system 300 can contain an instance of an asset that does not include sufficient intelligence to inform the updating component 304 of identify when such asset is coupled to a network. It may be known, however, how particular assets react to certain stimulation. Accordingly, when the asset is added to a network, a stimulating component (not shown) can provide the asset with certain electrical stimuli. The asset can be associated with, for example, a fingerprint and/or any other suitable identification data (e.g., radio frequency identification, bar code, serial number, etc.) that can be utilized to identify the asset, wherein the identification data makes itself known when provided with particular stimuli. Pursuant to one example, the stimulating component can be an electrical power source which provides certain electrical pulses to the asset to determine the identification data. For instance, the asset can react in a certain manner to particular stimuli, thus illuminating the identification data to be recognized by, for instance, a recognition component (not shown).

The recognition component can be trained to monitor responses of the asset with respect to certain stimuli provided by the stimulating component. Thus, the recognition component can determine an identity of the asset (and possibly relationships to other assets) by discerning the identification data associated with such asset. The updating component can thereafter utilize this information as well as other available information to update the hierarchical representation of assets 204. Thus, a representation of the asset can be placed appropriately within the hierarchical representation of assets 204 by the updating component. It is to be further appreciated that the graphical user interface component 102 can allow interaction, manipulation, and/or observation of such identification data, recognition alerts, etc.

Figure 4:
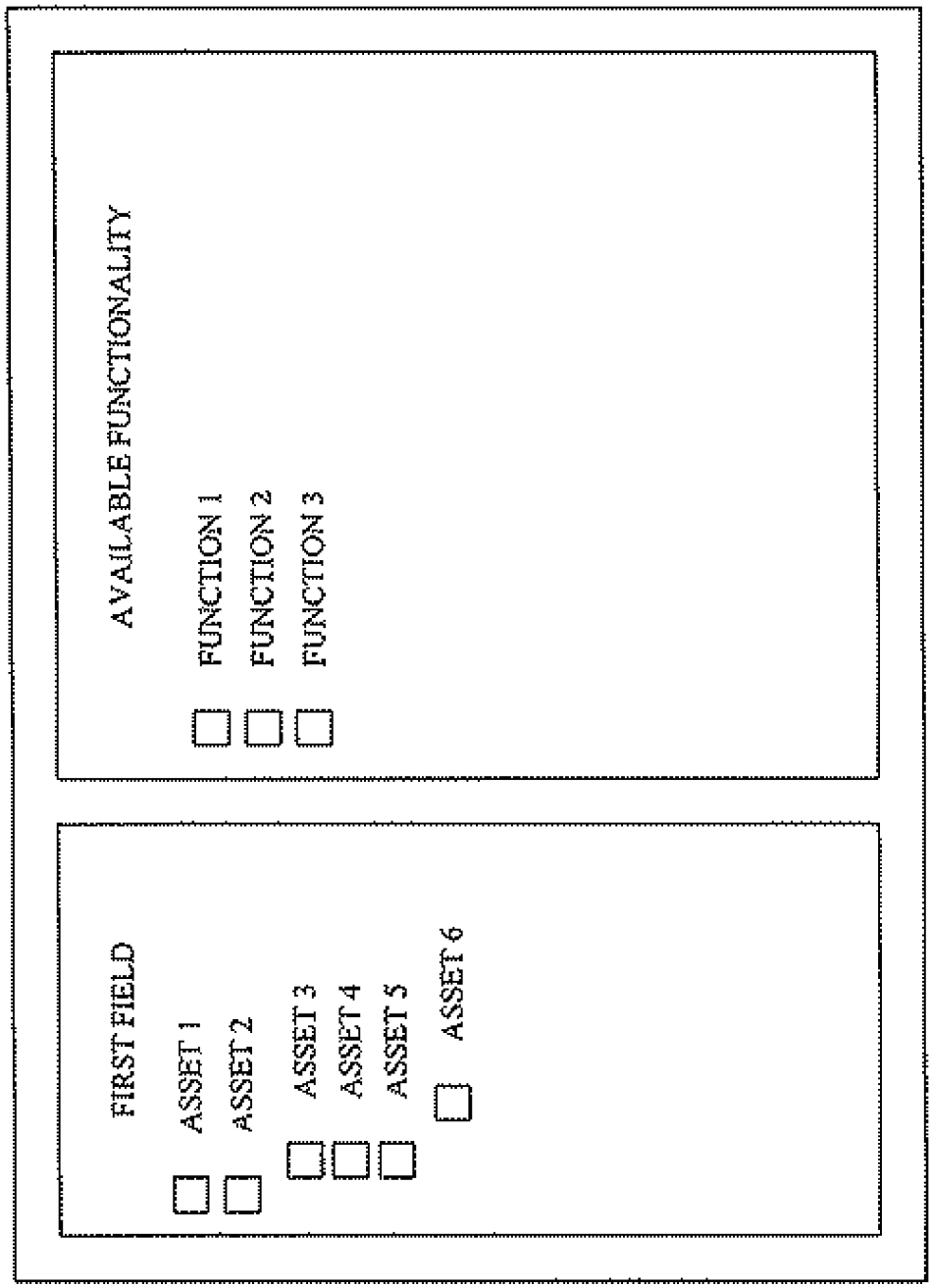
FIG. 4 illustrates an exemplary graphical user interface that facilitates management and/or monitoring of assets and respective functionalities within an industrial environment.

FIG. 4 illustrates an exemplary graphical user interface 400 that facilitates management and/or monitoring of assets and respective functionalities within an industrial environment. The graphical user interface 400 can include a first field and an available functionality field to allow user interaction, observation, manipulation, and/or management associated with at least one asset within an industrial environment. The graphical user interface 400 can be employed to traverse through a hierarchy of assets to select a desired asset. Further, the graphical user interface 400 can display management functionality associated with the selected asset. For example, the first field within the graphical user interface 400 can include an expandable hierarchy of assets, wherein buttons or the like can be selected by a pointing mechanism to expand or contract at least a portion of the hierarchy. Upon selection of an asset, a separate display field can be populated with a listing of management functionalities available with respect to the selected asset. Furthermore, the graphical representation of an asset can be provided upon selection of the asset, and portions of such graphical depiction can be selectable by a user to "drill down" to review more granular data and/or enable more granular functionality. For one specific example, a selected asset can be a mixer that is associated with several sensors that are employed to sense parameters relating to vibration. A graphical depiction (not shown) of the mixer can be provided, wherein portions thereof can be selectable to provide a user with more granular data. For instance, an arrow can be associated with a portion of the mixer associated with a sensor such that the sensor is employed for vibration analysis. By selection of the sensor, the graphical user interface 400 can provide the user with data relating to that sensor.

As mentioned above, the first field can include the hierarchical representation of assets associated with the industrial environment. In general, various configurations can be employed for such navigational assistance through the plurality of assets. In one example, the assets can be arranged in a physical location-based hierarchy, wherein the physical location of the asset can correspond to the physical location within the industrial environment. Therefore, navigation and/or traversing through the plurality of assets can be simplified in a logical, asset-centric, browsing manner and/or technique utilizing the first field of the graphical user interface 400. Moreover, once an asset is selected, the respective available functionality can be depicted in the available functionality field. It is to be appreciated that each particular asset within the industrial environment can have distinct and respective available functionalities. In addition, it is to be appreciated that the graphical user interface 400 can include numeral configurations, options, aesthetics, sizes, shapes, etc. and the claimed subject matter is not so limited to such illustrated characteristics in FIG. 4.

Figure 5:
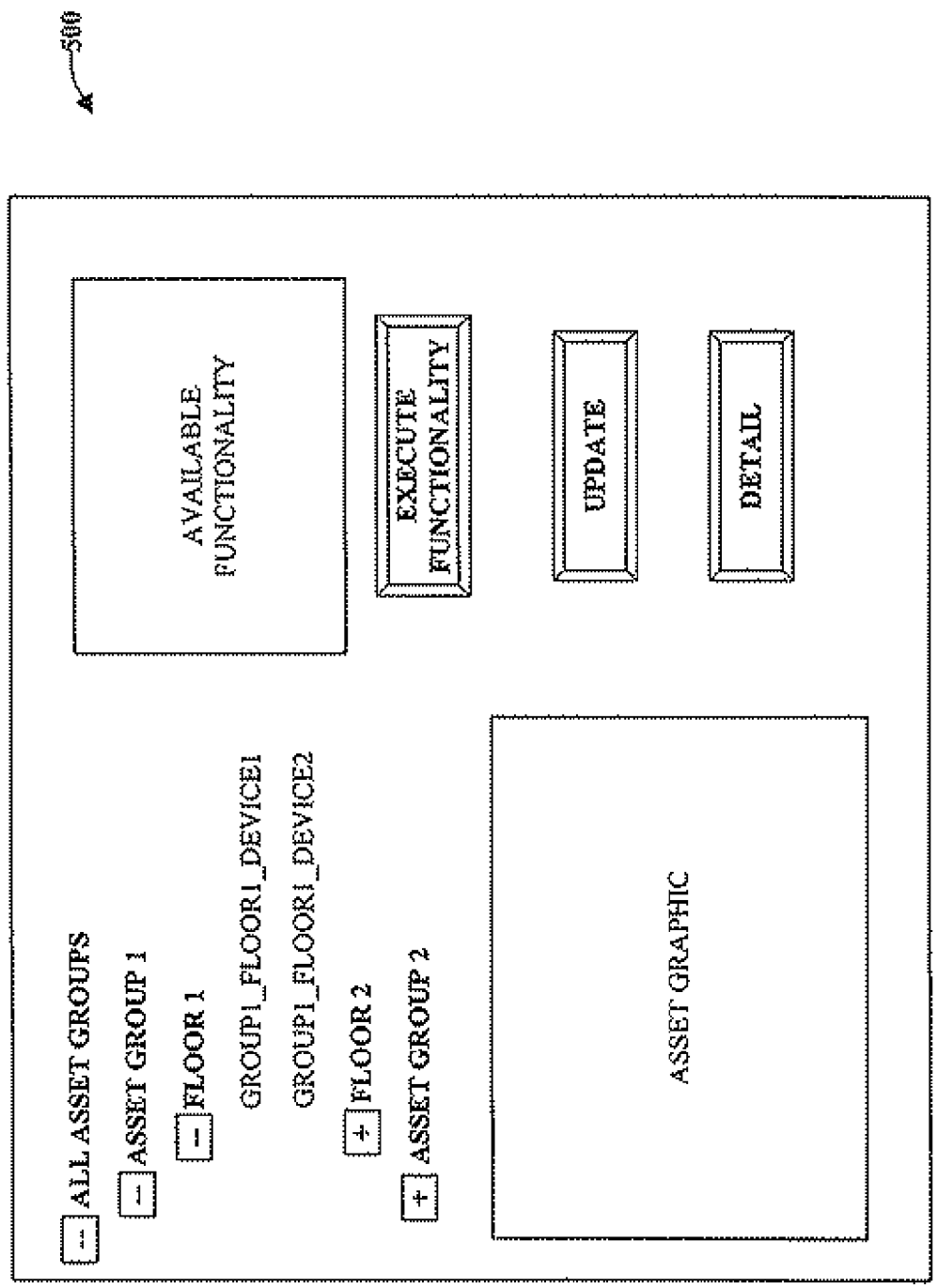
FIG. 5 illustrates an exemplary graphical user interface that facilitates managing assets and respective functionalities related to an industrial environment.

FIG. 5 illustrates a graphical user interface 500 that facilitates managing assets and respective functionalities related to an industrial environment. The graphical user interface 500 can provide various graphics, fields, data, functions, etc. in relation to providing asset management and/or monitoring within an industrial environment. It is to be appreciated and understood that the graphical user interface 500 is one depiction of numerous configurations for such an interface and that minor changes and/or subtleties are to be included within the subject innovation. Moreover, it is to be appreciated that the graphical user interface 500 can be substantially similar to the graphical user interfaces and/or the graphical user interface components previously described.

The graphical user interface 500 can include a listing of at least a portion of assets associated with an industrial environment. For example, the listing of assets can be categorized by at least one of alphabetical name, cost-based listing, hierarchically (e.g., location, industrial environment location, functionality, etc.), and the like. In particular, the graphical user interface 500 illustrates a hierarchical structure based on location of the assets within the industrial environment. As depicted, the graphical user interface 500 can allow a user and/or entity to traverse the listing of assets in an organized manner that is access-centric. Upon selecting a particular asset, the graphical user interface 500 can provide various options associated therewith. For instance, an asset graphic can employ a geographic map identifying the location of the asset. In another example, the asset graphic can be a graphic illustrating the selected asset. Thus, if a pump was selected, a graphic of the particular pump can be displayed to ensure correctness of the selected asset. In an additional example, the asset graphic can be utilized to allow a user to navigate the assets within an industrial environment by implementing an illustration of a particular upper-level asset and/or area of the industrial environment.

As discussed above, the available functionality can be displayed to allow a user to select and execute (e.g., utilizing a graphical button referred to as "execute functionality") an available functionality respective to a selected asset. It is to be appreciated that the available functionality can be utilized to ascertain particular assets (e.g., a reverse lookup rather than starting with a selected asset). Thus, a backup functionality can be selected that can identify the various assets that can implement the backup and/or respect information with the asset graphic. The graphical user interface 500 can further include graphical buttons to initiate options related to the various data associated therewith. Specifically, the graphical user interface 500 includes an update graphical button that can provide updates associated with changes and/or manipulations of assets, asset functionality, asset hierarchy, asset graphics, and/or any other suitable data related to the graphical user interface and/or the industrial environment. The graphical user interface 500 can also include a detail graphical button that can provide details associated with assets, asset hierarchy, asset graphics, available functionality, and the like.

The graphical user interface 500 can display the hierarchical representation of assets as well as functionality available therewith (upon selection of a representation of at least one asset). Therefore, the graphical user interface 500 can display state-dependent functionality to a user. According to one example, verifying a particular procedure may not be available while devices utilized within the procedure are associated with certain states. Therefore, the graphical user interface 500 will not display such functionality as being available. Once the user selects a particular functionality, the graphical user interface 500 can perform the selected asset management functionality on selected assets within the industrial environment.

Figure 6:
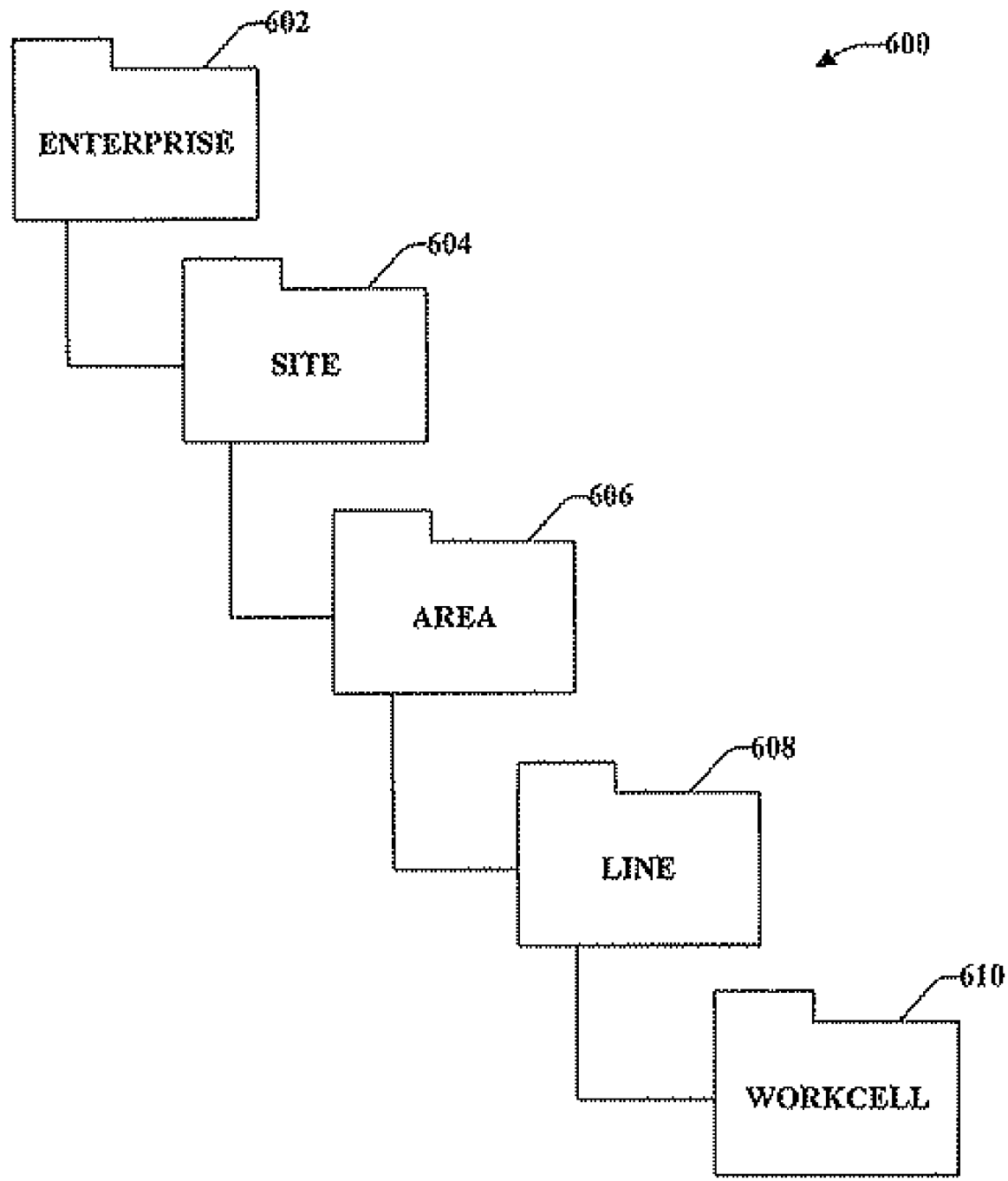
FIG. 6 illustrates a block diagram of an exemplary data structure that represents a hierarchical structure of an industrial automation system.

Referring now to FIG. 6, an exemplary hierarchical structure 600 which can be utilized in connection with the hierarchically structured data model (e.g., hierarchical representation of assets) alluded to herein is illustrated. For example, the data model can facilitate nested structures, thereby mitigating deficiencies associated with data models that employ flat namespaces. The structure 600 includes an enterprise level 602, where a particular enterprise can be represented within data structured in accordance with a hierarchical data model. Beneath the enterprise level 602 can be a site level 604, so that a particular factory (site) within an enterprise can be represented within a data packet. Beneath the site level 604 an area level 606 can exist, which specifies an area within the factory that relates to the data. A line level 608 can lie beneath the area level 606, wherein the line level 608 is indicative of a line associated with particular data. Beneath the line level 608 a workcell level 610 can exist, thereby indicating a workcell associated with the data. Utilizing a nested, hierarchical data model, PLCs can become more aware of data associated therewith. Furthermore, the hierarchy 600 can be customized by an owner of such hierarchy. For instance, more granular objects/levels can be defined within the hierarchy 600 in relation to the various assets associated therewith.

Figure 7:
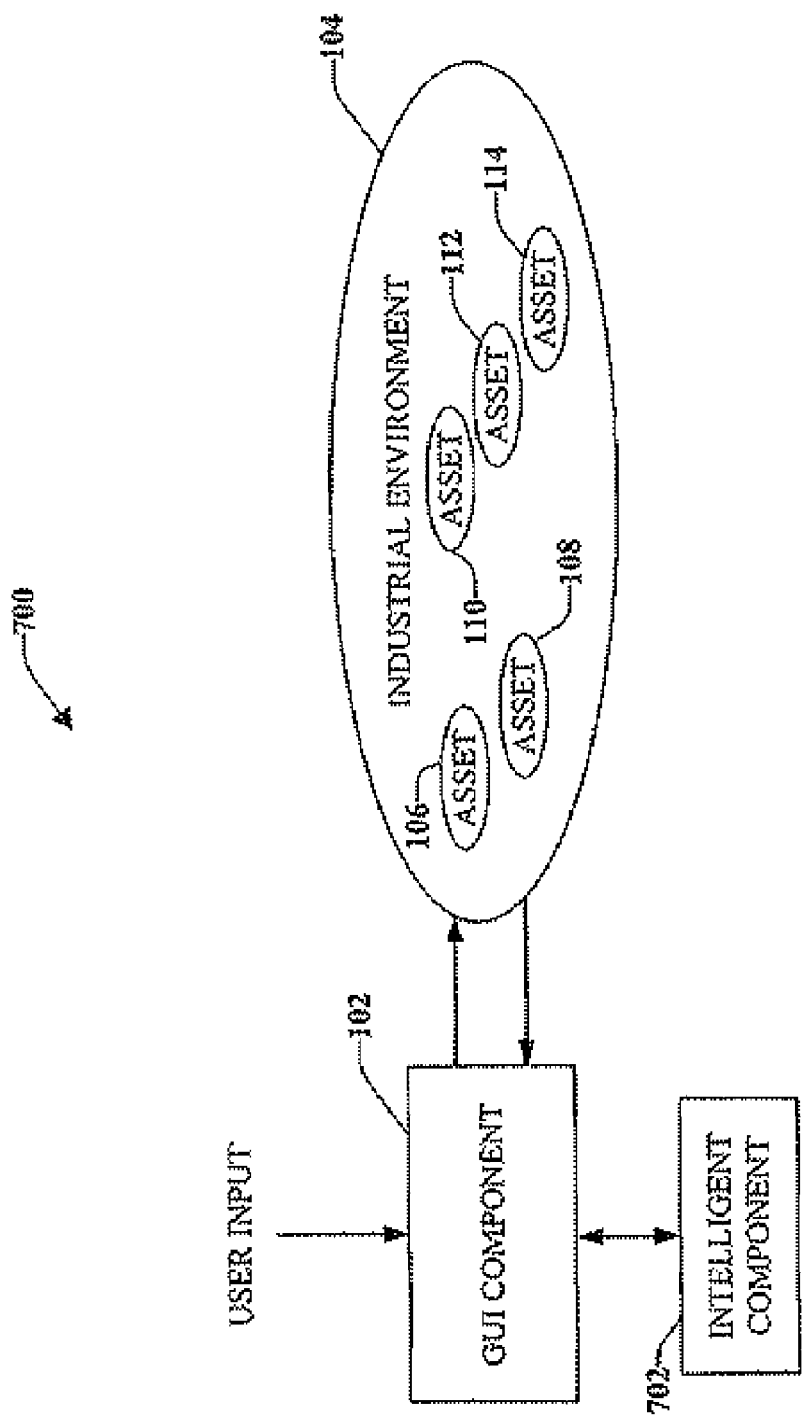
FIG. 7 illustrates a block diagram of an exemplary system that facilitates employing a graphical user interface to monitor and/or manage an asset within an industrial environment.

FIG. 7 illustrates a system 700 that employs intelligence to facilitate employing a graphical user interface to monitor and/or manage an asset within an industrial environment. The system 700 can include a graphical user interface component 102, an industrial environment 104 with assets 106-114 that can all be substantially similar to respective components, environments, and assets described in previous figures. The system 700 further includes an intelligent component 702. The intelligent component 702 can be utilized by the graphical user interface component 102 to facilitate providing monitoring and/or managing for at least one asset within the industrial environment. For example, the intelligent component 702 can infer assets added, removed, settings, details, asset locations, asset and respective functionality available, security settings, updates, detection of changes with an asset, asset identification data, hierarchical representation of assets within the industrial environment, user settings, profiles, graphical user interface aesthetics, etc.

It is to be understood that the intelligent component 702 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The graphical user interface component 102 (herein referred to as the GUI component 102) can provide various types of user interfaces to facilitate interaction between a user and any component coupled to the industrial environment 104 including assets 106-114. As depicted, the GUI component 102 is a separate entity that can be utilized with the industrial environment 104. However, it is to be appreciated that the GUI component 102 and/or similar view components can be incorporated into the industrial environment 104 and/or a stand-alone unit. The GUI component 102 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to the industrial environment 104.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 8:
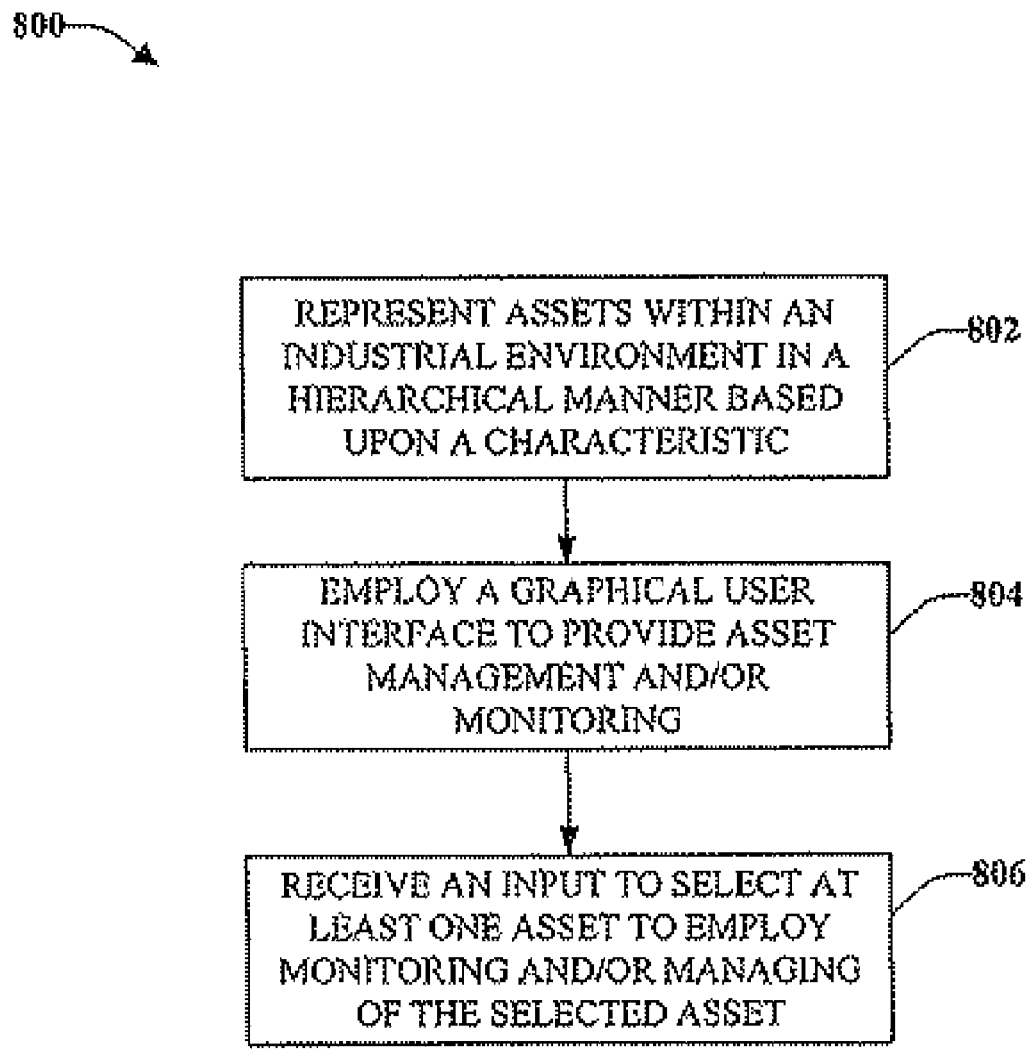
FIG. 8 illustrates an exemplary methodology for implementing a graphical user interface allowing a user to traverse through a hierarchy of assets related to an industrial environment.
Figure 9:
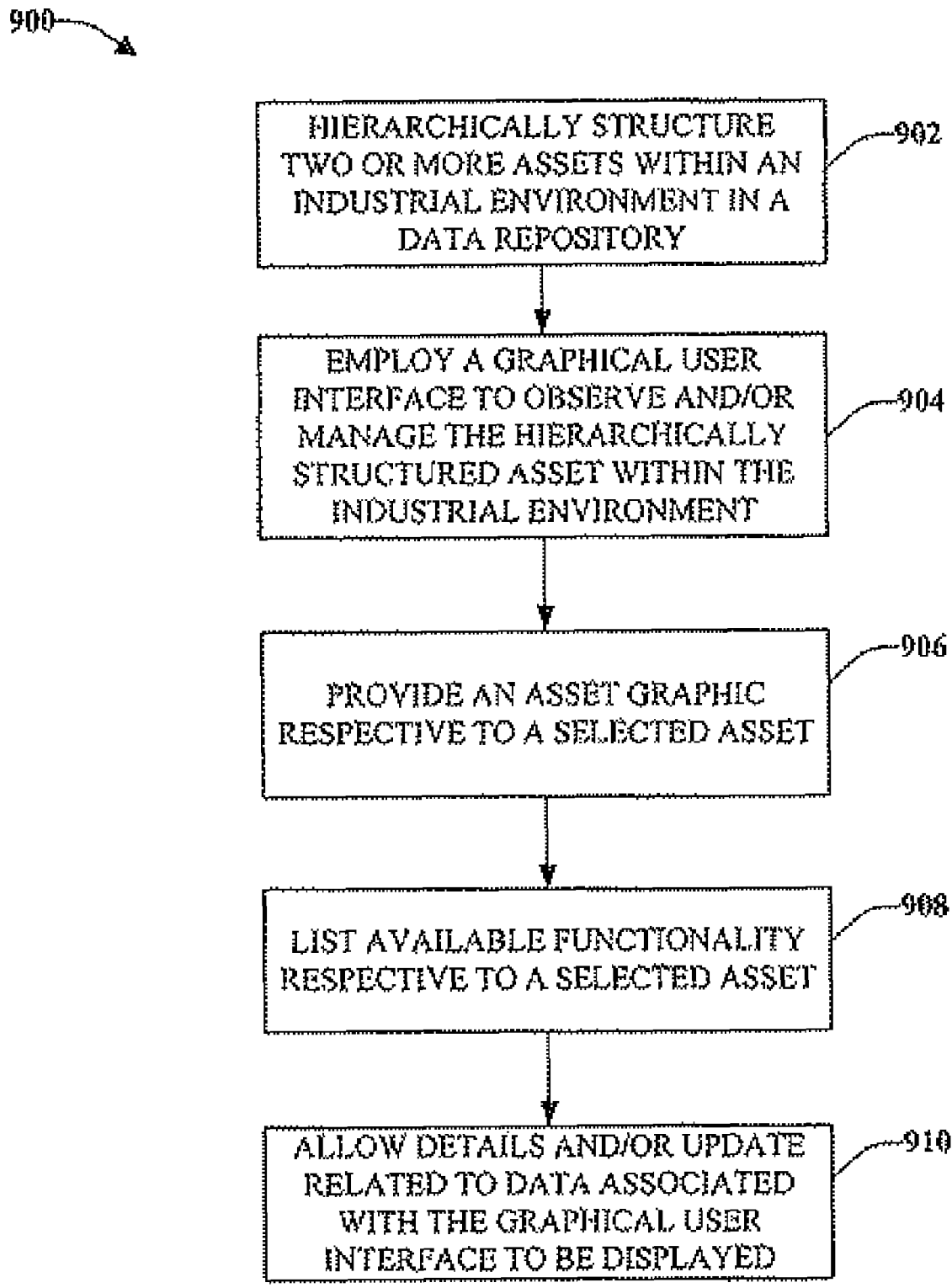
FIG. 9 illustrates an exemplary methodology that facilitates employing a graphical user interface to monitor and/or manage an asset within an industrial environment.

Referring to FIGS. 8-9, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 8 illustrates a methodology 800 for implementing a graphical user interface allowing a user to traverse through a hierarchy of assets related to an industrial environment. At reference numeral 802, assets within an industrial environment can be represented in a hierarchical manner based upon a characteristic. For instance, an asset can be a physical device, such as a programmable logic controller, a pump, a press, a valve, a drain, a heater, a cooler, a switch, a sensor, a conveyor, and/or a portion thereof, as well as software, firmware, etc. The industrial environment can include various assets wherein at least two assets can be hierarchically arranged, such as one that is utilized to manufacture consumables, textiles, automobiles, or any other suitable industrial environment. To illustrate another example hierarchy, the asset may be a programmable logic controller, while the assets may be different control programs effectuated by the asset. Thus, the hierarchical representation of assets may be a combination of physical devices and software.

In addition, the hierarchy can be based at least in part upon a characteristic such as, but not limited to, the physical location of devices (e.g., a region of a factory can have several defined sub-regions, which in turn can comprise sub-regions), standards associated with industry, such as ISA, S95, ISA S88, and the like, proprietary hierarchy that is provided by an enterprise, or any other suitable hierarchy. For instance, a top portion of the hierarchy may be a plant, and a sub-level of the plant may be programmable logic controllers utilized within the plant, and a sub-level of the programmable logic controllers can be devices controlled by such controllers. It is understood that this is but one example of a hierarchy, and is for illustrative purposes only.

At reference numeral 804, a graphical user interface can be employed to provide asset management and/or monitoring of at least one asset. For instance, management can relate to validating an asset, backing up an asset, archiving data associated with an asset, updating an asset with new or additional software or firmware, and the like. The graphical user interface can provide a first field including a listing of the assets within the industrial environment. For example, the listing of assets can be categorized by at least one of alphabetical name, cost-based listing, hierarchically (e.g., location, industrial environment location, functionality, etc.), and the like. In particular, the graphical user interface can illustrate a hierarchical structure based on location of the assets within the industrial environment. The graphical user interface can allow a user and/or entity to traverse the listing of assets in an organized manner that is access-centric. Furthermore, the graphical user interface can provide an additional field including available functionality. At reference 806, an input to select at least one asset to employ monitoring and/or managing of the selected asset can be received. Once selected, the asset can be displayed within the hierarchical representation (e.g., first field) and/or the respective available functionality can be displayed in the additional field.

FIG. 9 illustrates a methodology 900 that facilitates employing a graphical user interface to monitor and/or manage an asset within an industrial environment. At reference numeral 902, two or more assets within an industrial environment can be hierarchically structured in a data repository. The data repository that can retain a hierarchical representation of assets and can be a single data repository and/or can be a distributed data store. The hierarchy can be based at least in part upon the physical location of devices (e.g., a region of a factory can have several defined sub-regions, which in turn can comprise sub-regions), standards associated with industry, such as ISA, S95, ISA S88, and the like, proprietary hierarchy that is provided by an enterprise, or any other suitable hierarchy. For instance, a top portion of the hierarchy may be a plant, and a sub-level of the plant may be programmable logic controllers utilized within the plant, and a sub-level of the programmable logic controllers can be devices controlled by such controllers. It is understood that this is but one example of a hierarchy, and is for illustrative purposes only.

At reference numeral 904, a graphical user interface can be employed to allow observation and/or management of the hierarchically structured assets within the industrial environment. For example, the graphical user interface can include a first field that provides the assets within the industrial environment in the hierarchical representation to allow traversing therewith. For example, pull-down and/or pull-up menus can be implemented to allow drilling down and/or drilling up into the hierarchy according to a received input (e.g., user input, data request, input device, pointing mechanism, etc.).

At reference numeral 906, an asset graphic can be provided respective to a selected asset. The asset graphic can employ a geographic map identifying the location of the asset. In another example, the asset graphic can be a graphic illustrating the selected asset. Thus, if a pump was selected, a graphic of the particular pump can be displayed to ensure correctness of the selected asset. In an additional example, the asset graphic can be utilized to allow a user to navigate the assets within an industrial environment by implementing an illustration of a particular upper-level asset and/or area of the industrial environment. At reference numeral 908, the graphical user interface can provide an available function field that displays the respective functions for a particular asset selected. Thus, a particular asset selected can have a distinct and respective functionality associated therewith to be displayed to allow initiation. At reference numeral 910, various options such as details and updates can be provided via the graphical user interface. For example, a graphical button can initiate options related to the various data associated therewith. Specifically, the graphical user interface can include an update graphical button that can provide updates associated with changes and/or manipulations of assets, asset functionality, asset hierarchy, asset graphics, and/or any other suitable data related to the graphical user interface and/or the industrial environment. The graphical user interface can also include a detail graphical button that can provide details associated with assets, asset hierarchy, asset graphics, available functionality, and the like.

Figure 10:
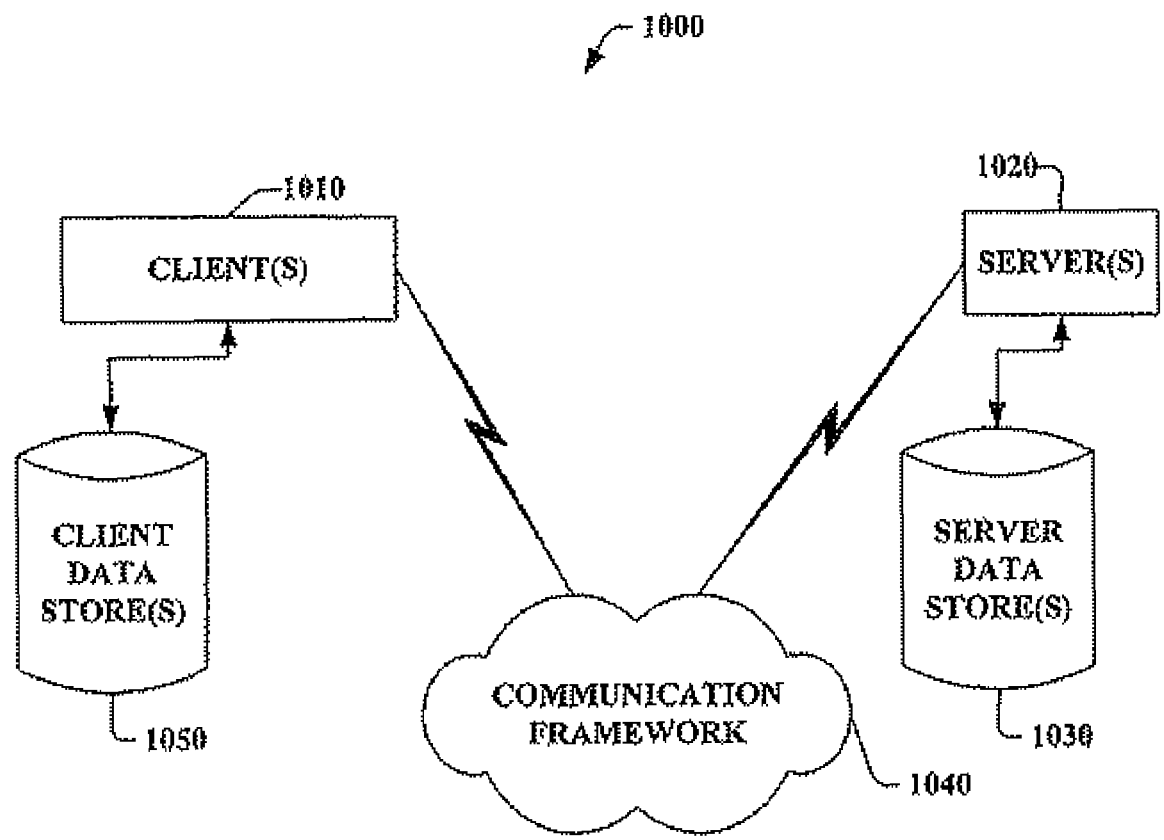
FIG. 10 is an exemplary computing environment that can be utilized in connection with the claimed subject matter.
Figure 11:
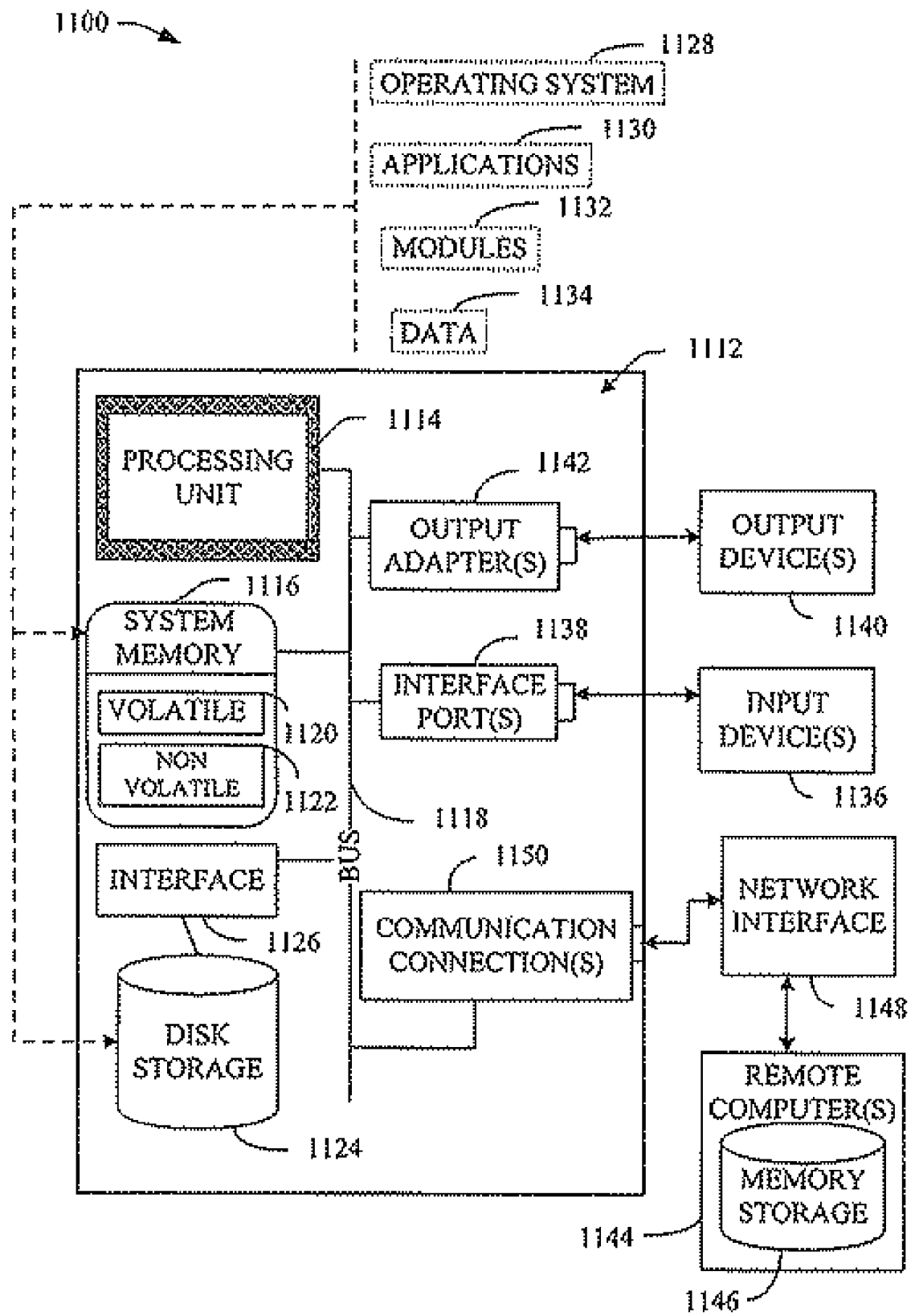
FIG. 11 is an exemplary networking environment that can be utilized in connection with the claimed subject matter.

In order to provide additional context for implementing various aspects of the claimed subject matter, FIGS. 10-11 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 10 is a schematic block diagram of a sample-computing environment 1000 with which the claimed subject matter can interact. The system 1000 includes one or more client(s) 1010. The client(s) 1010 can be hardware and/or software (e.g., threads, processes, computing devices). The system 1000 also includes one or more server(s) 1020. The server(s) 1020 can be hardware and/or software (e.g., threads, processes, computing devices). The servers 1020 can house threads to perform transformations by employing the subject innovation, for example.

One possible communication between a client 1010 and a server 1020 can be in the form of a data packet adapted to be transmitted between two or more computer processes. The system 1000 includes a communication framework 1040 that can be employed to facilitate communications between the client(s) 1010 and the server(s) 1020. The client(s) 1010 are operably connected to one or more client data store(s) 1050 that can be employed to store information local to the client(s) 1010. Similarly, the server(s) 1020 are operably connected to one or more server data store(s) 1030 that can be employed to store information local to the servers 1020.

With reference to FIG. 11, an exemplary environment 1100 for implementing various aspects of the claimed subject matter includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), or flash memory. Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in the suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the claimed subject matter can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:
1. A system, comprising:
a memory that stores computer-executable components; and
a processor, communicatively coupled to the memory, that facilitates execution of the computer-executable components, the computer-executable components including:
a graphical user interface configured to receive a selection input, comprising:
a first field that displays a representation of a hierarchy of assets within an industrial environment;
a second field that displays available functionality relating to management of an asset selected within the first field, the available functionality includes one or more functions that are executed on the asset selected within the first field, based on the selection input received by the graphical user interface; and
a graphical representation of the asset selected within the first field that comprises a geographic map which identifies a location of the asset, wherein the graphical representation includes at least one portion, which, in response to selection, at least one of provides granular data or enables granular functionality.

2. The system of claim 1, wherein the hierarchy of the assets is determined based at least in part upon a physical location of the assets within the industrial environment.

3. The system of claim 1, wherein the hierarchy of the assets is determined based at least in part upon an industry standard including at least one of Industrial Standard Architecture (ISA), S95, or ISA S88.

4. The system of claim 1, wherein the hierarchy of the assets is determined based at least in part upon a proprietary hierarchy that is provided by an enterprise.

5. The system of claim 1, wherein the asset selected within the first field is at least one of a physical device, software, or firmware.

6. The system of claim 1, wherein the asset within the industrial environment is configured to execute a set of the one or more functions in response to the set of the one of more functions being selected via the selection input.

7. The system of claim 1, wherein the one or more functions include at least one of validating the asset selected within the first field, backing up the asset selected within the first field, archiving data associated with the asset selected within the first field, updating the asset selected within the first field with new software, updating the asset selected within the first field with new firmware, or updating the asset selected within the first field with additional firmware.

8. The system of claim 1, further comprising an input device configured to employ at least one of a pointing and clicking technique, a touch-screen, a voice command, or software that receives the selection input.

9. The system of claim 1, wherein the representation of the hierarchy of assets allows access to at least one of the asset selected within the first field or the available functionality to permeate through one or more lower levels of the hierarchy of the assets.

10. The system of claim 1, wherein the graphical representation comprises a graphic illustrating the asset selected within the first field.

11. The system of claim 1, wherein the graphical representation comprises a graphic of a particular upper-level asset that facilitates navigation through the assets within the industrial environment.

12. The system of claim 1, wherein the graphical user interface is further configured to provide an update related to a change to at least one of the asset selected within the first field, an asset functionality, the representation of the hierarchy of the assets, an asset graphic, or data associated with the industrial environment, in response to selection of a graphical button on the graphical user interface.

13. The system of claim 1, wherein the graphical user interface is further configured to provide details associated with at least one of the asset selected within the first field, an asset functionality, the representation of the hierarchy of the assets, an asset graphic, or data associated with the industrial environment, in response to selection of a graphical button on the graphical user interface.

14. The system of claim 1, wherein the graphical user interface is further configured to receive a selection of an option relating to the available functionality associated with the asset selected within the first field and permeate the selection through lower levels of the hierarchy of assets by application of the selection to one or more assets that are at a level lower than the asset selected within the first field.

15. The system of claim 1, further comprising a data repository that retains the representation of the hierarchy of the assets within the industrial environment.

16. The system of claim 1, further comprising, a security component configured to manage access to at least one asset or at least one available functionality via the graphical user interface, the security component further being configured to provide varying levels of access based at least in part on a location of an asset in the hierarchy of the assets or a type of the available functionality, and provide different measures of security based on different states of the assets within the industrial environment.

17. The system of claim 16, wherein the levels of access provided by the security component vary with time.

18. The system of claim 15, further comprising a detection component configured to ascertain, without user intervention, at least one of when a first asset has been added to the industrial environment, when a second asset has been removed from the industrial environment, or when a third asset has been updated within the industrial environment.

19. The system of claim 18, wherein the detection component is further configured to receive a message from at least one of the first, second, or third asset, the message includes at least one of a type of the asset, an identity of the asset, a location upon a network of the asset, or an associated asset.

20. The system of claim 18, wherein the detection component is further configured to receive information from the at least one of the first, second, or third asset based on identification data to detect and maintain alterations of the assets within the industrial environment.

21. The system of claim 18, further comprising an updating component configured to update the representation of the hierarchy of the assets within the data repository based upon an alteration determined by the detection component.

22. The system of claim 21, the graphical user interface is further configured to utilize at least one of a graphic or an alert to reflect an update in relation to at least one of the representation of the hierarchy of the assets within the data repository or the assets within the industrial environment.

23. The system of claim 15, the data repository includes at least one electronic document that is associated with at least one asset employed within the industrial environment, wherein the at least one electronic document is descriptive of at least at one of an operation of the at least one asset, or operation instructions.

24. A method, comprising:
displaying a representation of a hierarchy of assets within an industrial environment in a first field;
in response to receiving a first input selecting an asset within the first field, displaying, in a second field, available functionality relating to management of the asset that includes a function that is executed on the asset;
displaying, in a third field, a graphical representation of the asset selected within the first field that comprises a geographic map identifying a location of the asset; and
in response to receiving a second input selecting a portion within the graphical representation, presenting granular data associated with the portion of the graphical representation, wherein the granular data includes more detailed information than data associated with the graphical representation.

25. The method of claim 24, further comprising:
determining the hierarchy of the assets based at least in part upon respective physical locations of the assets within the industrial environment.

26. A non-transitory computer-readable storage medium comprising computer-executable instructions that, in response to execution, cause a system comprising a processor to perform operations, comprising:
displaying in a first field, a representation of a hierarchy of assets within an industrial environment;
in response to receiving a first input selecting an asset of the hierarchy of assets, displaying, in a second field, available functionality relating to management of the asset that includes a function that is executed on the asset;
in response to receiving the first input, displaying, in a third field, a graphical representation of the asset that comprises a geographic map identifying a location of the asset; and
in response to receiving a second input selecting a portion within the graphical representation, enabling granular functionality associated with the portion of the graphical representation, wherein the granular functionality includes more detailed information than the available functionality.

27. The non-transitory computer-readable storage medium of claim 26, wherein the operations further comprise:
determining the hierarchy of the assets based at least in part upon respective physical locations of the assets within the industrial environment.

* * * * *